United States Patent [19]

Boothe

[11] 4,407,045

[45] Oct. 4, 1983

[54] LADDER HINGE AND MULTI-POSITION LOCKING MECHANISM THEREFOR

[76] Inventor: Leland H. Boothe, 247 South 600 East, Alpine, Utah 84003

[21] Appl. No.: 333,229

[22] Filed: Dec. 21, 1981

[51] Int. Cl.³ ........................ E05D 11/10; F16C 11/10

[52] U.S. Cl. ........................................ 16/327; 16/329; 182/22; 182/163; 403/92

[58] Field of Search ................. 16/327, 334, 387, 372, 16/329, 333, 326, 362, 353, 349; 182/207, 208, 209, 24, 25, 22–27, 104, 163, 165; 403/83, 92

[56] References Cited

U.S. PATENT DOCUMENTS

| | | | |
|---|---|---|---|
| 3,692,143 | 9/1972 | Kummerlin | 186/24 |
| 3,811,151 | 5/1974 | Kummerlin | 16/329 |
| 3,955,240 | 5/1976 | Schuh et al. | 182/163 X |
| 4,025,109 | 5/1977 | Klingelhofer | 16/329 X |
| 4,210,224 | 7/1980 | Kummerlin et al. | 184/207 |
| 4,216,844 | 8/1980 | Klafs | 16/329 X |

*Primary Examiner*—Gil Weidenfeld
*Assistant Examiner*—John S. Brown

[57] ABSTRACT

An improved hinge for a collapsible ladder includes a pivot pin which has a sufficiently simple construction to permit it to be fabricated by die-casting on a cost-competitive basis. The simple construction is made possible by an improved axial detent arrangement for a shaft which rotates and slides within the hub and to which the hinge locking pins are secured. The detent arrangement includes a detent bore extending radially biased against the shaft. A suitable detent recess in the shaft is angularly aligned with the detent bore for each locking position of the shaft. Axial alignment of the bore and a recess is achieved by fully extending the shaft out of the hub against the restoring force of a bias spring in the hub. The recess and bias member are contoured to permit disengagement of the detent by rotation of the shaft but not by axially applied forces.

28 Claims, 9 Drawing Figures

LADDER HINGE AND MULTI-POSITION LOCKING MECHANISM THEREFOR

BACKGROUND OF THE INVENTION

1. Field of the Invention

The present invention relates to an improved ladder hinger and locking mechanism therefor, and more particularly to a ladder hinge that has a plurality of locking positions, is structurally sound and inexpensive to manufacture.

2. The Prior Art

Ladders are commonly used for a variety of applications and are of two general types. One type is a folding ladder, commonly called a step ladder, which is self-supporting. Step ladders are typically used for such tasks are pruning, painting ceilings, or other similar tasks where it may be impossible to lean the ladder against a structure for support. The other type of ladder which is well known is the straight extension ladder. This type of ladder is simply leaned against the wall or some other structure when standing or climbing on the ladder.

Ladders which are constructed to that they may be used as both step ladders and as straight extension ladders have long been known in the art. For example, see U.S. Pat. Nos. 594,303, 1,100,823 and 3,912,043. Typically, such ladders are constructed with hinges in the middle of the side rails. The hinges permit the ladder to be folded into a step ladder configuration or unfolded into a straight extension ladder configuration. Such ladders, commonly referred to as combination step and extension ladders, are very versatile and they combine the desirable features of both types of ladders.

However, combination step and extension ladders have historically presented problems with respect to the ladder hinge. Typically, the ladder hinge is provided with two sets of support plates. Each set of support plates is rigidly attached to a respective stringer of the ladder. The support plates rotate about a central hub so that the ladder may be folded into the step ladder configuration or may be unfolded into the extension ladder configuration. Furthermore, the ladder hinge comprises a locking mechanism for locking the ladder into the various configurations. In particular, prior art devices provide a locking mechanism having spring-biased locking pins which engage apertures provided in the support plates. To accommodate the springs for biasing the locking pins, the prior art devices are provided with a central hub having a tubular cross-section. Although the ladder hinge is structurally sound as long as the locking pins engage the support plates, it has been found that the structural integrity of the ladder hinge is greatly compromised when the locking pins are withdrawn from the support plates as hereinafter set forth.

With the locking pins withdrawn from the support plate apertures, forces applied to the ladder are focused at the tubular central hub which, alone, must bear the force. Initially, the tubular hub was fashioned out of a rigid, plastic material. However, experience has shown that the rigid, plastic hub was easily broken during the folding or unfolding of the ladder from one configuration to another if any resistance to the rotation of the support plates was encountered, or if any forces were placed on the ladder hinge directly.

In an effort to overcome the breakage problem, the rigid plastic hub was replaced with a malleable, plastic hub. If forces were applied to the malleable, plastic hub, the hub was simply deformed rather than broken. However, it was found that the malleable, plastic hub eventually became permanently deformed as a result of repeated folding and unfolding. Moreover, the friction between the hub and the support plates caused grooves to be formed in the hub which gave rise to a misalignment of the locking apertures of the individual support plates. Consequently, the locking pins were able to only partially engage the ladder hinge and, thus, presented a potential danger to the user. For example, with the locking pins only partially inserted, substantial forces placed on the ladder could cause mutual shearing between the support plates and collapse of the ladder.

It would be desirable to replace the plastic support hub found in the prior art with a metal support hub thereby alleviating the problems discussed above. However, due to the configuration of the support hub (as described in some detail hereinbelow in relation to FIGS. 6A, 6B and 7), and due to the functional operation of the locking mechanism, it would be necessary to form the central hub by a die casting process if the hub were to be made of metal. When made out of plastic, the hub can be formed by injection molding or some other inexpensive plastic manufacturing process. However, it will be appreciated that substantial costs arise with the necessity of acquiring an expensive dye for metal die casting.

In an attempt to have the structural integrity of a metal hub and yet at the same time benefit from the relatively inexpensive plastic hub, a metal sleeve was placed about the exterior surface of the plastic hub at its support plate-engaging portion. However, this configuration did not prove to be a viable alternative. For example, it was found to be very difficult to rigidly secure the metal shank to the plastic hub and still allow for the proper operation of the locking mechanism. As a result, the metal shank often worked itself free from the support plates and the condition described above once again became a problem.

Another disadvantage of the prior art ladder hinge hub described above concerns the detent arrangement for holding the locking pins withdrawn until the pins are rotated relative to the hub away from the previous locked position. In the prior art device, as described below in relation to FIGS. 6A, 6B and 7, the release mechanism for the detent arrangement tends to fail due to wear and tear. The result is that the locking pins are "frozen" in the withdrawn position and cannot be inserted into the support plate apertures. This prevents locking the ladder in any discrete position, making it unsafe for use.

Accordingly, what is needed is an improved ladder hinge which may be locked into a plurality of positions, which is inexpensive to manufacture and which is structurally sound. Such an invention is disclosed and claimed herein.

BRIEF SUMMARY AND OBJECTS OF THE INVENTION

In accordance with the present invention, an improved ladder hinge for a combination step and extension ladder comprises a metal hub which houses an improved detent arrangement. The resulting hinge has increased structural integrity while at the same time, it is readily manufacturable at a competitive cost.

In the preferred embodiment, the hub comprises a tubular metal housing through which one end of a rotatable shaft projects to engage the locking pins handle. The shift is spring biased toward retraction within the hub, thereby biasing the locking pins toward their locking position in which they project through aligned holes in the hinge plates. At least one radially-extending bore is defined through said one end of the hub and contains a bias spring which urges a detent ball radially against the shaft. The shaft, in turn, includes plural truncated spherical recesses disposed at angularly spaced positions at a predetermined axial location of the shaft. The angular positions of the recesses correspond to angular locking positions of the locking pins so that for each locking position of the pins, a recess is angularly aligned with the detent bore. The axial position of the detent recesses is defined to provide axial alignment between the bore and the recesses when the shaft is withdrawn sufficiently, in opposition to its axial spring bias, to permit the distal ends of the locking pins to more than clear out of the hinge plates. The recess is contoured to permit the detent ball to disengage the recess when the shaft is rotated; however, the axial spring bias force cannot dislodge the detent ball from the recess in the axial direction. Thus, when the axially detented shaft is rotated from a locking position, the detent is removed. However, such rotation also mis-aligns the hinge plate locking apertures so that the distal ends of the biased locking pins retract slightly to bear against the surface of one of the hinge plates until locking aperture alignment is once again achieved. In this regard, it is important that the distal ends of the locking pins be axially spaced from the cleared hinge plate by a sufficient amount in the detented position to preclude detenting when the locking pins are rotated to their next locking position.

The simple hub construction, using a radial bore rather than a complex slot for detent, permits die casting in metal on a cost competitive basis.

It is therefore a primary object of the present invention to provide an improved ladder hinge with increased structural integrity.

It is a further object of the present invention to provide an improved ladder hinge which is designed for increased durability.

It is an even further object of the present invention to provide an improved ladder hinge that is inexpensive to manufacture.

These and other objects and features of the present invention will become more fully apparent from the following description and appended claims taken in conjunction with the accompanying drawings.

DETAILED DESCRIPTION OF THE PREFERRED EMBODIMENT

Figure 1:
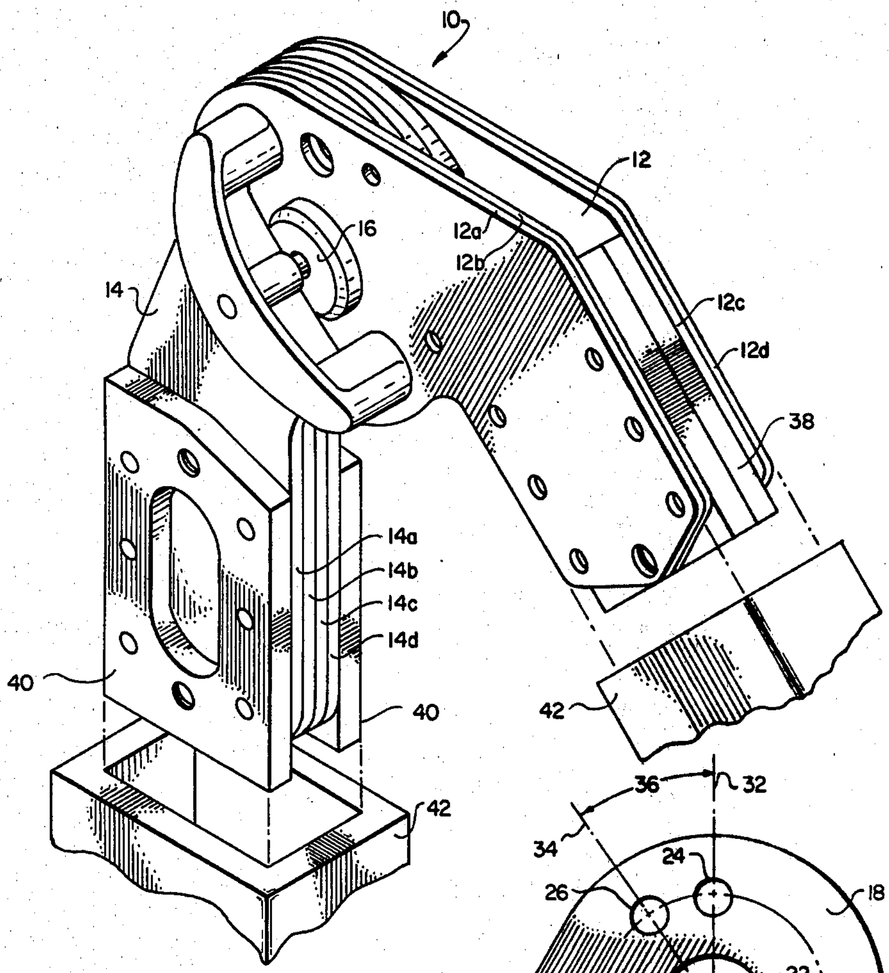
FIG. 1 is a perspective view of a ladder hinge and locking mechanism of the present invention.

Reference is now made to the figures wherein like parts are designated with like numerals throughout. With particular reference to FIG. 1, the ladder hinge of the present invention is illustrated and generally designated by the numeral 10. Ladder hinge 10 generally comprises two sets of interlocking support plates 12 and 14 and a locking mechanism 16.

Figure 2:
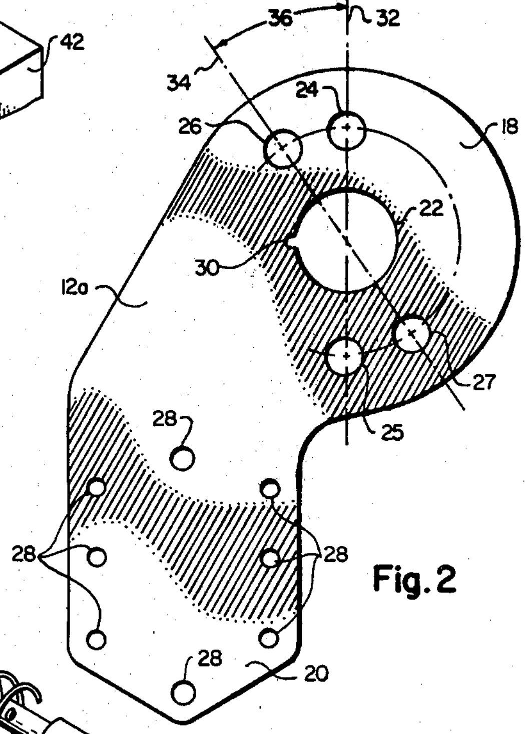
FIG. 2 is a plan view of one support plate of the ladder hinge of FIG. 1.

In the preferred embodiment, each set of support plates 12, 14 is made up of four individual support plates 12*a–d* and 14*a–d*, respectively. It will be appreciated, however, that any number of individual support plates could be used for support plate sets 12, 14. The configuration of each support plate 12*a–d*, 14*a–d* is identical and will, therefore, be described with reference to plate 12*a*. Referring to FIG. 2, support plate 12*a* has an essentially annular portion 18 and a stringer engaging portion 20 which extends generally tangentially outward from annular portion 18. Support plate 12*a* is provided with a plurality of apertures: aperture 22 at the center of annular portion 18 for receiving a portion of locking mechanism 16 in mating relationship, four locking apertures 24–27 spaced at equal radial distances from aperture 22, and apertures 28 located in stringer engaging portion 20 for rigidly securing ladder hinge 10 to the stringers of a ladder. Plate 12*a* is also provided with locating notch 30 in aperture 22 which assures proper orientation of support plate 12*a* with respect to locking mechanism 16. As further illustrated in FIG. 2, locking apertures 24, 25 lie on the same diammetric axis 32 of annular portion 18 on opposite sides of aperture 22. Similarly, locking apertures 26, 27 lie on diammetric axis 34. Apertures 24–27 are radially spaced apart in the presently preferred embodiment such that the angle 36 between axes 32 and 34 is approximately thirty-five degrees.

Referring to FIG. 1, plates 12 and 14 engage one another in interlocking relationship. A pair of spacers 38 is interposed between the stringer engaging portion 20 of plates 12*b* and 12*c* so as to provide a space between the annualar portion 18 of plates 12*b* and 12*c* for receiving the annular portion of plates 14 therebetween. To reduce wear on plates 12 and 14, replaceable inserts (not shown) are placed between plates 12*b* and 14*a* and between plates 12*c* and 14*d*. Accordingly, the width of spacers 38 should generally correspond to the widths of plates 14 *a–d* plus the width necessary for the replaceable inserts. A second pair of spacers 40 is attached to the stringer engaging portion 20 of plates 14*a* and 14*d* so that the stringer engaging portions 20, of both sets of plates 12 and 14, along with spacers 38 and 40 have essentially the same overall dimensions. As further illustrated in FIG. 1, the stringer engaging portions 20 of plates 12, 14 in combination with spacers 38, 40 are dimensionally configurated so as to engage tubular stringer portions 42, whereby ladder hinge 10 may be ridigly secured to ladder stringers.

As will be hereinafter more fully described, plates 12 and 14 can be rotated relative to one another about aperture 22. As plates 12, 14 are rotated relative to one another, it will be appreciated that at least one pair of locking apertures 24–27 of plates 14 come into exact alignment with at least one pair of the locking apertures 24–27 of plates 12 at a plurality of positions which correspond to the various ladder configurations (e.g. folded for storage, folded for step ladder, or unfolded for extension ladder).

Figure 3:
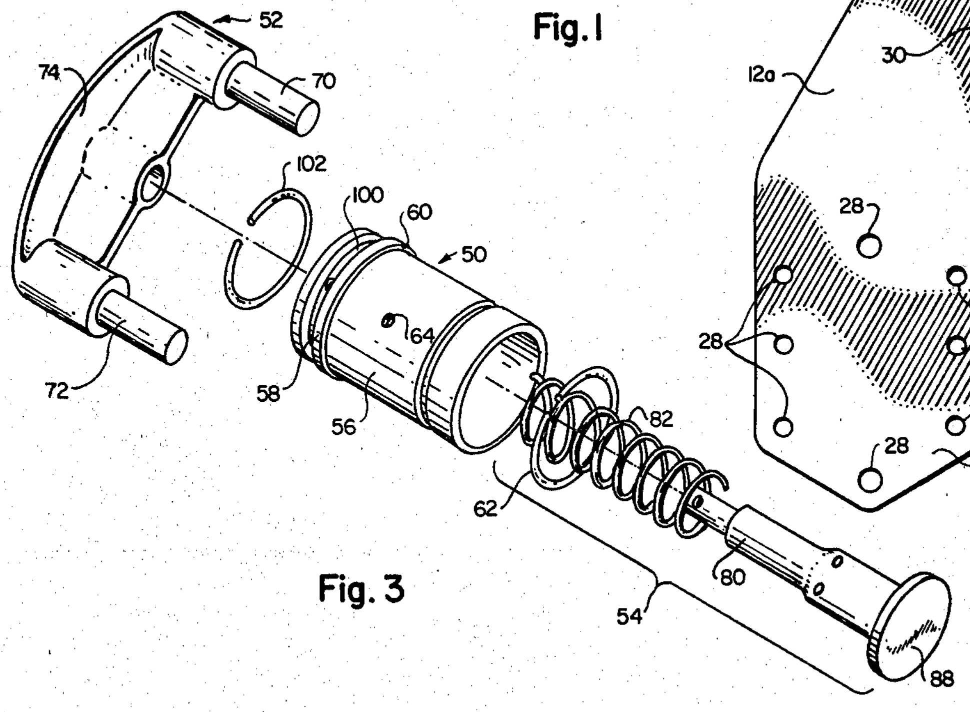
FIG. 3 is an exploded perspective view of the locking mechanism of the present invention.
Figure 4A:
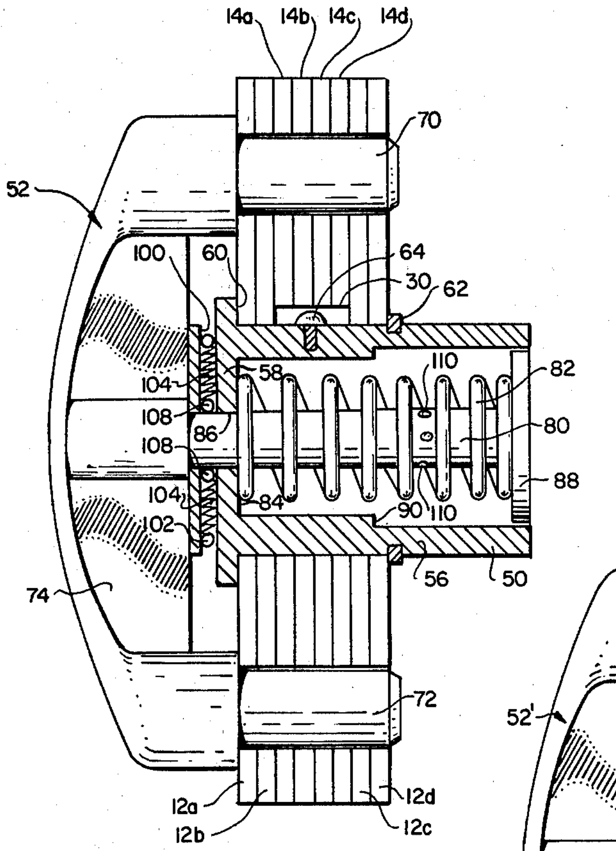
FIG. 4A is a detailed side view in partial cross-section of the locking mechanism of the present invention in the locked position.
Figure 4B:
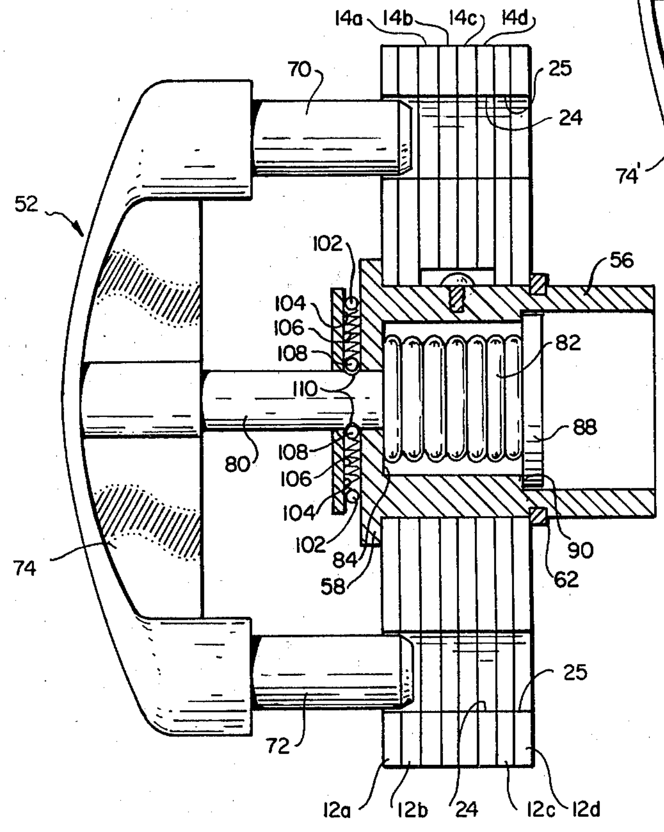
FIG. 4B is a detailed side view impartial cross-section of the locking mechanism of the present invention in the unlocked position.

Referring to FIGS. 3, 4A and 4B, locking mechanism 16 includes essentially three components: central hub 50, locking handle 52 and biasing member 54. Hub 50 is preferably machine tooled from a suitable grade of tool steel and includes a portion 56 of generally tubular cross-section with an annular ring portion 58 integrally attached thereto at one end. Tubular portion 56 is dimensionally configurated to engage aperture 22 of plates 12, 14 in mating relationship, and ring portion 58 presents a diametrally enlarged flange 60 which cooperates with split ring 62 to axially position hub 50 with respect to plates 12, 14. Hub 50 is also provided with a locating pin 64 which engages locating notch 30 of plates 12, 14. As will be hereinafter more fully described, locating pin 64 engages plates 12 and 14 in such a way that plates 14 are fixed relative to hub 50 while plates 12 are free to rotate thereabout.

Locking mechanism 16 is provided with locking handle 52 for locking plates 12 and 14 into a fixed position relative to one another. Locking handle 52 has a pair of locking pins 70, 72 which are dimensionally configurated to engage locking apertures 24–27 in mating relationship. Integrally attached to the proximal ends of locking pins 70, 72 is a handle portion 74 provided for ease in manipulating locking pins 70, 72. Locking pins 70, 72 are biased so as to engage plates 12, 14 whenever plates 12 and 14 are rotated to a position relative to one another such that at least one pair of locking apertures 24–27 in each set of plates 12, 14 are aligned with locking pins 70, 72.

Rigidly connected to locking handle 52 is an elongated shaft member 80 which extends a diametrically reduced aperture 86 in annular ring portion 58 and terminates in an enlarged disc portion 88 within tubular portion 56. A bias spring 82 is situated within tubular portion 56 and is positioned between disc portion 88 and the interior shoulder 84 of annular ring portion 58 so as to exert a force against disc 88 thereby biasing elongated shaft member 80 and locking handle 52 to the right as viewed in FIGS. 4A and 4B. Due to the bias of spring 80, the normal position of locking handle 52 and elongated shaft member 80 is as illustrated in FIG. 4A.

Locking mechanism 16 can be inserted into the apertures provided in locking plates 12 and 14 by, first, rotating plates 12 and 14 to a position wherein the locating notches 30 (FIG. 2) are aligned. Locating notches 30 are positioned in plates 12, 14 such that, when notches 30 are aligned, locking apertures 24 and 25 of plates 12 are aligned with locking apertures 25 and 24, respectively, of plates 14. After aligning locating pin 64 with notches 30 and aligning locking pins 70, 72 with the aligned locking apertures 24–27, locking mechanism 16 is inserted into plates 12 and 14 and split ring 62 is placed around hub 50 as illustrated in FIG. 4, to hold plates 12 and 14 in position between split ring 62 and annular ring portion 58. With plates 12 and 14 coupled to locking mechanism 16, ladder hinge 10 comprises a unitary assembly that can be rigidly fastened to the stringers of a combination step and extension ladder as described previously.

With further reference to FIGS. 4A and 4B, plates 12 and 14 are locked into a fixed rotative or angular position relative to one another so long as pins 70 and 72 engage the aligned apertures 24–27 as illustrated in FIG. 4A. As discussed above, spring 82 biases the locking pins 70, 72 so that they normally engage plates 12 and 14. Rotation of plates 12 and 14 from one position to another may be effectuated, however, by grasping handle 74 and withdrawing pins 70 and 72 from locking apertures 24–27 of plates 14 as illustrated in FIG. 4B. After rotating plates 12 and 14 relative to one another an incremental distance from the previous position, the locking handle 52 can be released as the locking apertures 24–27 of plates 12 and 14 are no longer aligned and the bias of spring 82 simply forces the distal ends of pins 70 and 72 into abutting engagement with the surface of plate 14*a*.

As further illustrated in FIG. 4B, the extent to which locking pins 70 and 72 can be withdrawn from locking apertures 24–27 is limited by shoulder 90. Shoulder 90 is provided in hub 50 to limit the axial movement of disc portion 88 and is positioned so that pins 70 and 72 can be withdrawn from the locking apertures 24–27 in plates 12*c*, *d* and 14*a–d*, but may continue to extend into the locking apertures of plates 12*a* and 12*b*. It is important that when disc portion 88 abuts shoulder 90, so that locking pins 70, 72, are fully withdrawn, the distal ends of the locking pins are retracted somewhat beyond the plane of the surface of plate 14*a* which faces plate 12*b*. When the plates are then mutually rotated to mis-align the apertures 24–27, spring 82 forces pins 70, 72 to move slightly before the distal ends of the pins can contact plate 14*a*. The importance of this spacing is described in detail below with respect to the detent mechanism. Furthermore, hub 50 is constrained to rotate along with plates 14 due to the fact that locating pin 64 is situated approximately half-way between annular ring portion 58 and split ring 62 and engages the notches 30 in plates 14*b* and *c*. Accordingly, the ladder hinge 10 consists of two assemblies which are engaged in counter-rotation relative to one another as the configuration of ladder hinge 10 is altered.

As described above, due to the spring bias on locking handle 52, it is necessary to axially detent locking pins 70 and 72 in the withdrawn position while plates 12 and 14 are rotated an incremental distance from the previous position. Otherwise, pins 70 and 72 would simply "snap" back into the aligned locking apertures thereby locking the ladder hinge 10 in the position from which it was desired to move. Although locking handle 52 could be retained in its withdrawn or extended position manually, while at the same time rotating plates 12 and 14, it will be appreciated that such a task would be extremely difficult if it were necessary to manipulate a pair of ladder hinges and a pair of ladder sections all at the same time, as would be required with a combination step and extension ladder. Accordingly, the ladder hinge 10 of the present invention is provided with an axial detent mechanism for automatically retaining the locking handle 52 and locking pins 70, 72 in the withdrawn position while the ladder hinge 10 is rotated an incremental distance from a previously locked position.

Referring further to FIG. 3, 4A and 4B, hub 50 is also provided with a second annular recess 100 about the exterior surface of annular ring portion 58, which recess receives a second split ring 102. A through-bore 104 extends diametrically through annular ring portion 58 at recess 100 and communicates from one side of annular recess 100 to the other through reduced aperture 86. Situated within opposite radial legs of through-bore 104 are a pair of compression springs 106 and a respective pair of detent ball bearings 108 which are retained in bore 104 by split ring 102. As illustrated in FIG. 4A, springs 106 exert a force on ball bearings 108, causing them to engage the shank of shaft 80 in abutting relationship. As further illustrated in FIG. 4A, shaft 80 is provided with a plurality of radially spaced partially spherical recesses 110 positioned on the shank thereof. Shaft 80 is preferably provided with a total of four recesses 110, the angular spacing of which corresponds to the angular spacing of locking apertures 24–27 of plates 12,14. Through-bore 104 and recesses 110 are strategically positioned on hub 50 and shaft 80, respectively, such that the recesses are axially aligned with bore 104 when locking pins 70, 72 are in their fully withdrawn or extended position illustrated in FIG. 4B. This position is defined by disc 88 abutting shoulder 90. In addition, one pair of recesses 110 is angularly aligned with through-bore 104 whenever the ladder hinge 10 is in a locked position (i.e. a pair of locking apertures in plates 14 is aligned with a pair of locking apertures in plates 12). The axial location of recesses 110 along shaft 80 is chosen such that when the shaft and locking pins 70, 72 are fully extended, and recesses 110 are aligned with bore 104, the distal ends of pins 70, 72 are withdrawn some distance beyond plate 14*a*.

To rotate ladder hinge 10 from one locked position to another, pins 70 and 72 are withdrawn from the aligned locking apertures 24–27 thereby translating shaft member 80 axially or longitudinally until the angularly aligned recesses 110 some into direct axial alignment with through-hole 104 as illustrated in FIG. 4B. At this point, detent balls 108 are forced into the new angularly and axially aligned recesses 110 by the force of springs 106. The force of springs 106, in combination with the forces which the walls of through-bore 104 exert on detent balls 108 in recesses 110 is sufficient to enable detent balls 108 to retain locking handle 52 in the withdrawn position against the restoring force of spring 82. Locking pins 70 and 72 will be retained in the withdrawn position (see FIG. 4B) until plates 12 and 14 are rotated an incremental angular distance from the previously locked position as hereinafter set forth.

As described above, hub 50 and shaft 80 rotate in opposite directions when ladder hinge 10 is moved from one configuration to another since hub 50 must rotate in tandem with plates 14 and shaft member 80 is constrained to rotate with plates 12. Due to the counter-rotation of hub 50 and shaft 80, ball bearings 108 are forced out of the aligned recesses 110 by the curvature thereof as plates 12 and 14 are rotated an incremental distance from the previously locked angular position. As soon as ball bearings 108 are forced out of the aligned recesses 110, which is concurrent with misalignment of locking apertures 24–27, the distal ends of locking pins 70, 72 are urged axially against plate 14*a* in abutting relationship by the force of bias spring 82. Locking pins 70, 72 continue to engage plate 14*a* in abutting relationship until further rotation of plates 14 relative to plates 12 allows another pair of locking apertures 24–27 in plates 14 to come into alignment with the locking pins. At that time, the locking pins are urged through the aligned locking apertures to assume the locked position illustrated in FIG. 4A.

It should be noted that withdrawn locking pins 70, 72 are immediately forced into their retracted position when plates 12, 14 are mutually rotated to provide alignment between locking apertures 24–27. In this regard, it is important that shaft 80 not be axially detented in the new locking position before the shaft can be retracted by spring 82. In the preferred embodiment this is achieved by moving the shaft 80 and pins 70, 72 axially a small amount once the detent is disengaged. Specifically, in the axial detent position of shaft 80, the distal ends of locking pins 70, 72 are withdrawn a small distance beyond the plane of the surface of plate 14*a* which faces plate 12*b*. If the plates are then mutually rotated, thereby disengaging the detent while misaligning locking apertures 24–27, locking pins 70, 72 are biased forward through the locking apertures in plates 12*a* and 12*b* until the distal ends of the locking pins abut plate 14*a*. Continued mutual rotation of the plates to the new locking position is achieved with recesses 110 axially displaced from bore 104 by the small distance moved by pins 70, 72 after disengagement of the detent. This axial misalignment precludes ball 108 from entering a recess 110 at the new angular locking position and permits the pins 70, 72 to be quickly forced through the aligned locking apertures at that position by the action of spring 82.

Although the detent arrangement has been described in terms of a diametrically extending bore 104, one or more radially-extending bores, with suitable provided recesses 110, may be employed within the scope of the invention.

Figure 5:
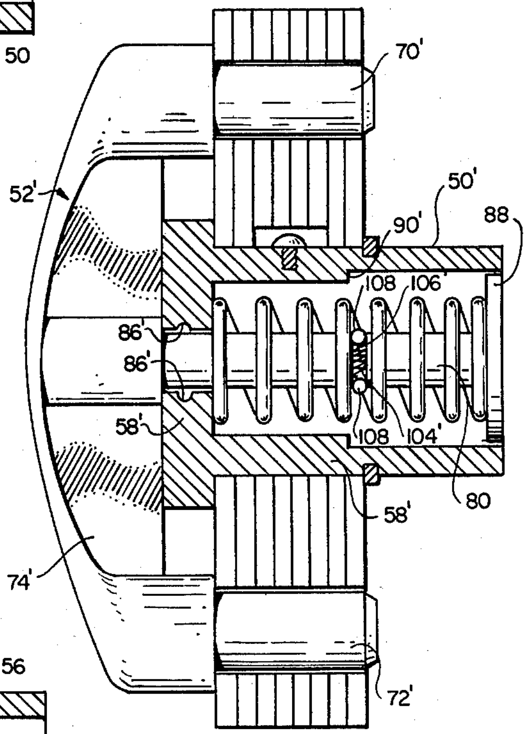
FIG. 5 is a detailed side view in partial cross-section of a second embodiment of the present invention shown in the locked position.

An alternative embodiment is illustrated in FIG. 5. The embodiment of FIG. 5 differs from that of FIG. 4 only in that a through-bore 104' is provided in elongated member 80, and recesses 110' are radially spaced about the reduced aperture 86' of annular ring portion 58'. A pair of detent balls 108' and spring 106' are positioned in through-bore 104'. Through-bore 104' is crimped in at least one point around the edge thereof to retain balls 108' from escaping from through-bore 104', while at the same time, allowing balls 108' to protrude from through-bore 104' a sufficient distance so as to engage recesses 110' in the withdrawn fully extended position of locking pins 70, 72.

Figure 6A:
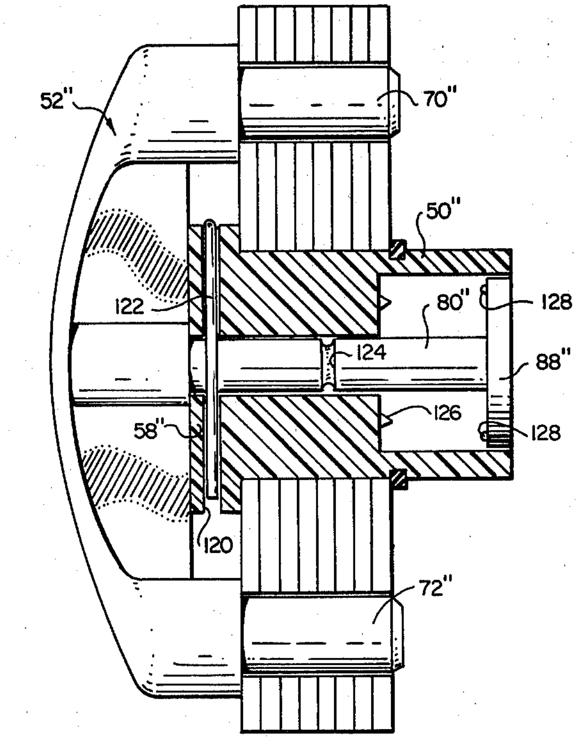
Fig. 6A PRIOR ART
FIG. 6A is a detailed side view in partial cross-section of a prior art locking mechanism shown in the locked position.
Figure 7:
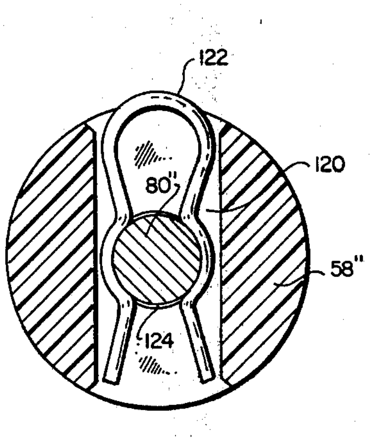
Fig. 7 PRIOR ART
FIG. 7 is a cross-sectional view taken along line 7—7 of FIG. 6B.

It will be appreciated that both of the above-described embodiments of the present invention represent a ladder hinge that is versatile and structurally safe. Hub 50 (or 50') in each case is easily machine-tooled from suitable grade of tool steel. Accordingly, hub 50 provides ample support, regardless of whether hinge 10 is in the locked or withdrawn position, to support forces encountered under normal use and, further, to provide a ladder hinge with an extended, if not indefinite lifetime. Further distinct advantages and features of the present invention may be appreciated by comparing the present invention to a typical prior art device illustrated in FIGS. 6A, 6B and 7.

Figure 6B:
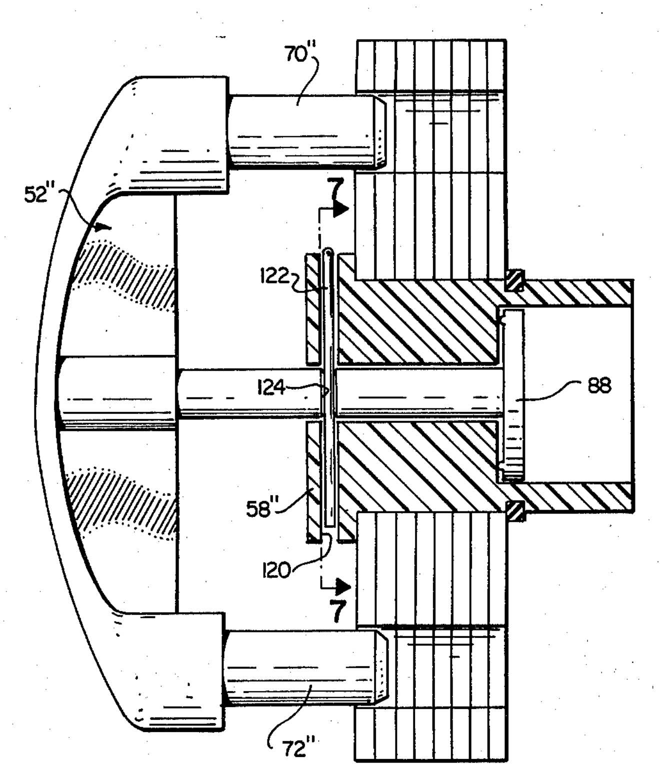
Fig. 6B PRIOR ART
FIG. 6B is a detailed side view in partial cross-section of a prior art locking mechanism of FIG. 6A shown in the unlocked position.

Hub 50'' is typically made of a malleable plastic material through a suitable process of injection molding. The disadvantages of a plastic hub are discussed hereinabove. Hub 50'' has a slot 120 through annular ring portion 58'' for receiving a spring pin 122. Spring pin 122 engages an annular recess 124 provided in shaft 80'' for the purpose of retaining the locking handle 52'' in the withdrawn position as illustrated in FIG. 6B. A bias spring, corresponding to spring 82 of FIGS. 4A and 4B, is omitted in FIGS. 6A and 6B to preserve clarity and facilitate understanding the operation. To overcome the previously discussed disadvantages of the plastic hub, hub 50" could be made out of metal. However, the presence of slot 120 would make it necessary to fabricate hub 50" with a relatively expensive die-casting operation which would result in a product that could not be competitively priced.

Additionally, prior art hub 50" is provided with axially-extending and angularly-spaced plastic protrusions 126 which selectively engage opposed axially-extending and similarly angularly spaced metal protrusions 128 provided on disc 88". When plates 12 and 14 are rotated relative to one another, protrusions 126 and 128 are brought into engagement to release locked shaft 80" from the restraining force of spring pin 122. Specifically, the protrusions extend a sufficient axial distance so that when they are engaged they force recess 124 out of engagement with spring pin 122, thereby breaking the axial detent and permitting spring 82" to retract locking pins 70, 72 when the locking apertures are next aligned. Over a period of time, it is not uncommon for plastic protrusions 126 to wear down a sufficient amount, or even break off, such that protrusions 126 and 128 are not large enough to release shaft 80" from the restraining force of spring pin 122. Accordingly, the locking pins are retained in the withdrawn position until some other method of releasing the elongated member 80" from the restraining force of pin 122 can be effected, and the ladder hinge is thereby rendered useless since it cannot be locked in a fixed position.

Therefore, it is clear that the present invention has two important and advantageous features when compared to the prior art. First, hub 50 is readily fabricated from metal using a relatively inexpensive die-casting process. Second, the detect arrangement, whereby springs 106 in bore 104 urge ball bearing 108 into recesses 110, is more reliable than the prior art arrangement involving recess 124 cooperating with spring pin 122 in slot 120 and released by projections 126 and 128. In addition, the simpler hub structure resulting from tnis detent arrangement permits the inexpensive die-casting process to be used.

It will be understood that, although the use of plural plates 12*a–d* and 14*a–d* have certain advantages of manufacture, the use of plural plates is not a crucial feature of the present invention. For example plates 12*a* and *b* may be made as one member, as could plates 12*c* and *d* and, likewise, plates 14*a–d*. Moreover, plates 12*a–d* may comprise a single member which is bifurcated to receive the corresponding portions of a single member 14*a–d*.

It should also be noted that, although the use of two diametrically oriented locking pins 70, 72 is advantageous, any number of such pins may be employed, including only one pin. Of course, the locking apertures 24–27 have to be provided accordingly. Where three or more locking pins are employed, locking apertures may have to be spaced at different radial distances.

Further, it should be noted that detent ball 108 and recess 110 of partially matching contour are advantageous in that they prevent axial movement of shaft 80 by spring 82 while permitting rotation of the shaft to disengage the detent mechanism. This rotational disengagement is possible because the curvature of shaft 80 has the effect of lowering the lip of the recess 110 along the sides so that detent ball 108 can be forced out of the recess upon angular displacement between shaft 80 and hub member 56. However, other configurations of detent members and recesses are possible to achieve the same result. For example, recess 110 can be a slot of V-shaped transverse cross-section adapted to receive a detent member in the form of a matching flat arrow-head. The taper of the arrow-head detent member permits disengagement upon rotation; however, the flat parallel surfaces of the arrow-head preclude detent disengagement by axial movement of shaft 80.

While specific embodiments of the invention have been described and illustrated, it will be clear that variations of the details of construction which are specifically illustrated and described may be resorted to without departing from the true spirit and scope of the invention as defined in the appended claims.

What is claimed and desired to be secured by Letters Patent is:

1. An improved hinge for collapsible ladders, said hinge being of the type wherein first and second members each have a head portion and a ladder stringer-engaging portion, the first and second members being pivotally engaged for rotation about a pivot axis extending generally perpendicularly through said head portions and having respective first locking apertures which are radially spaced from the pivot axis and can be selectively aligned and mis-aligned by mutual rotation of said first and second member about the pivot axis, and at least one locking pin which is selectively translated through the locking apertures, when aligned, from an unlocked to a locked position thereby preventing mutual rotation of the first and second members, the improved hinge further comprising:

a hub member having a longitudinal axis corresponding to the pivot axis and having a guide aperture defined therein about the longitudinal axis;

a guide shaft disposed in the hub member for both axially slidable translation between extended and retracted positions along the longitudinal axis through the guide aperture and rotation about the longitudinal axis;

a handle member securing together the guide shaft and a proximal end of the locking pin such that a distal end of the locking pin is translatable through the locking apertures when aligned;

bias means for applying an axial bias force to the guide shaft to urge the guide shaft toward the retracted position;

axial detent means responsive to the guide shaft being moved to its extended position for maintaining the guide shaft in the extended position in opposition to the bias force while permitting rotation of the guide shaft, the detent means comprising:

a first detent bore defined through one of said hub member and said guide shaft and at least a first detent recess defined in the other of said hub member and said guide shaft such that said first detent bore and first recess are axially aligned when the guide shaft is in the extended position and are angularly aligned when the locking apertures in said first and second members are aligned;

a first detent member disposed in the first detent bore and having a projecting portion configured to match the first detent recess; and first means disposed in the first detent bore for urging the projecting portion of the said first detent member radially toward the first detent recess; and wherein the distal end of the locking pin is spaced from at least the first member in the extended position of the guide shaft and is snapped into abutment with the first member through the locking aperture in the second member upon disengagement of the detent means by rotation of the shaft.

2. A hinge as defined in claim 1 wherein said first detent bore is defined radially through the hub member at a location proximate an end wall of said hub member, and wherein said first detent recess is defined in said guide shaft.

3. A hinge as defined in claim 2, said axial detent means further comprising:
a second detent bore extending radially from said end wall of the hub member to said guide aperture;
a second detent recess having a predetermined configuration defined in the guide shaft such that said second detent recess and second detent bore are axially aligned when the guide shaft is in the extended position and are angularly aligned when the locking apertures in the first and second members are aligned;
a second detent member disposed in the second detent bore and having a projecting portion configured to match the predetermined configuration of said second detent recess; and
second means disposed in the second detent bore for urging the projecting portion of the second detent member radially toward the guide shaft.

4. A hinge as defined in claim 3 wherein said first and second detent bores are diametrically aligned with respect to said longitudinal axis, and wherein said first and second detent recesses are diametrically aligned with respect to said longitudinal axis.

5. A hinge as defined in claim 2, wherein said first detent member is spherical in shape and wherein said first detent recess is configured as part of a sphere to receive the projecting portion of said spherical first detent member.

6. A hinge as defined in claim 1 wherein said one locking pin is selectively translated axially and parallel to said pivot axis through the locking apertures and said one locking pin extends parallel to the guide shaft at a radial spacing from the longitudinal axis which corresponds to the radial spacing of said locking apertures from said pivot axis.

7. A hinge as defined in claim 6, further comprising:
a second locking pin having a proximal end secured to the handle and a distal end, said second locking pin extending parallel to said one locking pin and radially spaced from the pivot axis; and
second locking apertures defined through the annular portions of each of the first and second members at the same radial spacing from the pivot axis as the locking apertures being angularly aligned with one another and with the second locking pin when the first locking apertures are aligned.

8. A hinge as defined in claim 2 wherein said one locking pin is selectively translated axially and parallel to said pivot axis through the locking apertures and said one locking pin extends parallel to the guide shaft at a radial spacing from the longitudinal axis which corresponds to the radial spacing of said locking apertures from said pivot axis.

9. A hinge as defined in claim 8 wherein said one locking pin is selectively translated axially and parallel to said pivot axis through the locking apertures and said one locking pin extends parallel to the guide shaft at a radial spacing from the longitudinal axis which corresponds to the radial spacing of said locking apertures from said pivot axis.

10. A hinge as defined in claim 2, wherein the hub member has an interior cylindrical wall in the form of two end-to-end sections of different diameter and extending in opposite longitudinal directions from an annular stop shoulder which faces away from said end wall, and wherein the hinge further comprises a stop member secured to an end of the guide shaft remote from the handle member and disposed within the cylindrical hub section remote from the end wall, said stop member having a dimension transverse to said longitudinal axis which is greater than the diameter of said annular stop shoulder so that the extended position of the guide shaft is defined when the stop member and stop shoulder are in abutting relation.

11. A hinge as defined in claim 10 wherein said bias means comprises a compression spring helically wound about the guide shaft in the hub member between the stop member and the end wall.

12. A hinge as defined in claim 1 wherein said first detent bore is defined radially through an end wall of the hub member, wherein said first detent recess is defined in the guide shaft, and wherein said end wall includes a generally annular channel defined therein, said first detent bore extending from the generally annular channel to the guide aperture, said hinge further comprising locking means resiliently engaged in said annular channel for retaining the first detent member and first urging means in the first detent bore.

13. A hinge as defined in claim 12, said axial detent means further comprising:
a second detent bore extending radially from the annular channel to the guide aperture;
a second detent recess having a predetermined configuration defined in the guide shaft such that said second detent recess and second detent bore are axially aligned when the guide shaft is in the extended position and are angularly aligned when the locking apertures in the first and second members are aligned;
a second detent member disposed in the second detent bore and having a projecting portion configured to match the predetermined configuration of said second detent recess; and
second means disposed in the second detent bore for urging the projecting portion of the second detent member radially toward the guide shaft.

14. A hinge as defined in claim 13 wherein said first and second detent bores are diametrically aligned with respect to said longitudinal axis, and wherein said first and second detent recesses are diametrically aligned with respect to said longitudinal axis.

15. A hinge as defined in claim 13, wherein said first detent member is spherical in shape and wherein said first detent recess is configured as part of a sphere to receive the projecting portion of said spherical first detent member.

16. A hinge as defined in claim 13 wherein said one locking pin is selectively translated axially and parallel to said pivot axis through the locking apertures and said one locking pin extends parallel to the guide shaft at a radial spacing from the longitudinal axis which corresponds to the radial spacing of said locking apertures from said pivot axis.

17. A hinge as defined in claim 16, further comprising:
a second locking pin having a proximal end secured to the handle and a distal end, said second locking pin extending parallel to said one locking pin and radially spaced from the pivot axis; and
second locking apertures defined through the annular portions of each of the first and second members at the same radial spacing from the pivot axis as the locking apertures being angularly aligned with one another and with the second locking pin when the first locking apertures are aligned.

18. A hinge as defined in claim 13, wherein the hub member has an interior cylindrical wall in the form of two end-to-end sections of different diameter and extending in opposite longitudinal directions from an annular stop shoulder which faces away from said end wall, and wherein the hinge further comprises a stop member secured to an end of the guide shaft remote from the handle member and disposed within the cylindrical hub section remote from the end wall, said stop member having a dimension transverse to said longitudinal axis which is greater than the diameter of said annular stop shoulder so that the extended position of the guide shaft is defined when the stop member and stop shoulder are in abutting relation.

19. A hinge as defined in claim 18 wherein said bias means comprises a compression spring helically wound about said guide shaft in said hub member between said stop member and said at least one end wall.

20. A hinge as defined in claim 1 wherein said first detent bore is defined in the guide shaft and the first detent recess is defined as a recess projecting radially into an end wall of the hub member proximate the guide aperture.

21. A hinge as defined in claim 20 wherein said first detent bore extends diametrically through the guide shaft and includes a second detent member configured similarly to the first detent member, wherein said first urging means is disposed in the first detent bore to urge said first and second detent members in opposite radial directions through opposite ends of the bore, and further comprising a second detent recess configured similarly to the first detent recess and defined to project radially into said end wall proximate the guide aperture diametrically across the guide aperture from the first detent recess.

22. A hinge as defined in claim 20 wherein said first detent member is spherical in shape and wherein said first detent recess is configured as part of a sphere to receive the projecting portion of said spherical first detent member.

23. A hinge as defined in claim 20 wherein said locking pin is selectively translated axially and parallel to said pivot axis through the locking apertures and said one locking pin extends parallel to the guide shaft at a radial spacing from the longitudinal axis which corresponds to the radial spacing of said locking apertures from said pivot axis.

24. A hinge as defined in claim 23, further comprising:

a second locking pin having a proximal end secured to the handle and a distal end, said second locking pin extending parallel to said one locking pin and radially spaced from the pivot axis; and second locking apertures defined through the annular portions of each of the first and second members at the same radial spacing from the pivot axis as the locking apertures being angularly aligned with one another and with the second locking pin when the first locking apertures are aligned.

25. A hinge as defined in claim 23, wherein said hub member has an interior cylindrical wall in the form of two end-to-end sections of different diameter and extending in opposite longitudinal directions from an annular stop shoulder which faces away from said end wall, and wherein the hinge further comprises a stop member secured to an end of the guide shaft remote from the handle member and disposed within the cylindrical hub section remote from the end wall, said stop member having a dimension transverse to said longitudinal axis which is greater than the diameter of said annular stop shoulder so that the extended position of the guide shaft is defined when the stop member and stop shoulder are in abutting relation.

26. A hinge as defined in claim 25 wherein said bias means comprises a compression spring helically wound about the guide shaft in the hub member between the stop member and the end wall.

27. A hinge as defined in claim 1, wherein said hub member has an interior cylindrical wall in the form of two end-to-end sections of different diameter and extending in opposite longitudinal directions from an annular stop shoulder which faces away from an end wall of the hub member, and wherein the hinge further comprises a stop member secured to an end of the guide shaft remote from the handle member and disposed within the cylindrical hub section remote from the end wall, said stop member having a dimension transverse to said longitudinal axis which is greater than the diameter of said annular stop shoulder so that the extended position of the guide shaft is defined when the stop member and stop shoulder are in abutting relation.

28. A hinge as defined in claim 27 wherein said bias means comprises a compression spring helically wound about the guide shaft in the hub member between the stop member and the end wall.

* * * * *

UNITED STATES PATENT AND TRADEMARK OFFICE

CERTIFICATE OF CORRECTION

PATENT NO. : 4,407,045

DATED : October 4, 1983

INVENTOR(S) : Leland H. Boothe

It is certified that error appears in the above—identified patent and that said Letters Patent is hereby corrected as shown below:

Title page, in the title, please insert --AN IMPROVED-- before "LADDER"

Column 1, line 8, "hinger" should be --hinge--

Column 1, line 24, "to" should be --so--

Column 2, line 26, "dye" should be --die--

Column 3, line 2, "shift" should be --shaft--

Column 3, line 26, "mis-aligns" should be --misaligns--

Column 3, line 63, "impartial" should be --in partial--

Column 4, lines 41 and 43, "diammetric" should be --diametric--

Column 4, line 52, "annualar" should be --annular--

Column 4, line 68, "ridigly" should be --rigidly--

UNITED STATES PATENT AND TRADEMARK OFFICE
CERTIFICATE OF CORRECTION

PATENT NO. : 4,407,045 
DATED : October 4, 1983
INVENTOR(S) : Leland H. Boothe

It is certified that error appears in the above—identified patent and that said Letters Patent is hereby corrected as shown below:

Column 7, line 36, "through-hole" should be --through-bore--

Column 8, line 35, "110'" should be --86'--

Column 8, line 36, delete "86'"

Column 8, line 43, "110'" should be --86'--

Column 9, line 39, "tnis" should be --this--

Column 10, line 23, "mis-aligned" should be --misaligned--

Signed and Sealed this

*Sixteenth* Day of *April 1985*

[SEAL]

*Attest:*

DONALD J. QUIGG

*Attesting Officer* *Acting Commissioner of Patents and Trademarks*